Sept. 27, 1927.  G. L. TARBOX  1,643,648

UNIVERSAL JOINT

Filed June 24, 1926  2 Sheets-Sheet 1

GURDON LUCIUS TARBOX
INVENTOR

BY Edw. V. Drakinsky
ATTORNEY

Sept. 27, 1927.  G. L. TARBOX  1,643,648
UNIVERSAL JOINT
Filed June 24, 1926  2 Sheets-Sheet 2
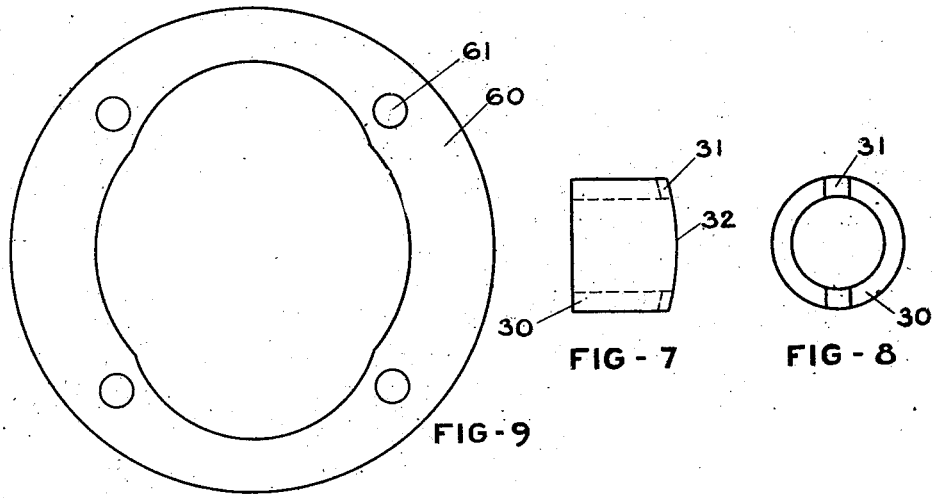
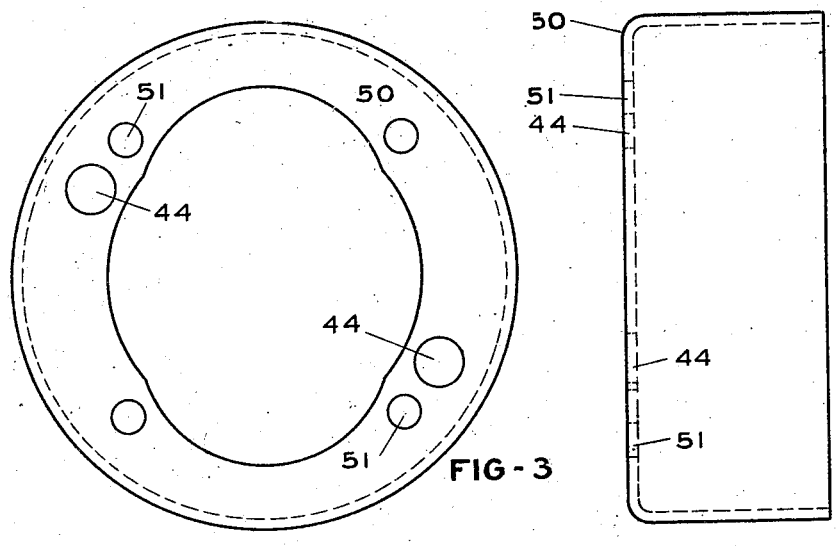
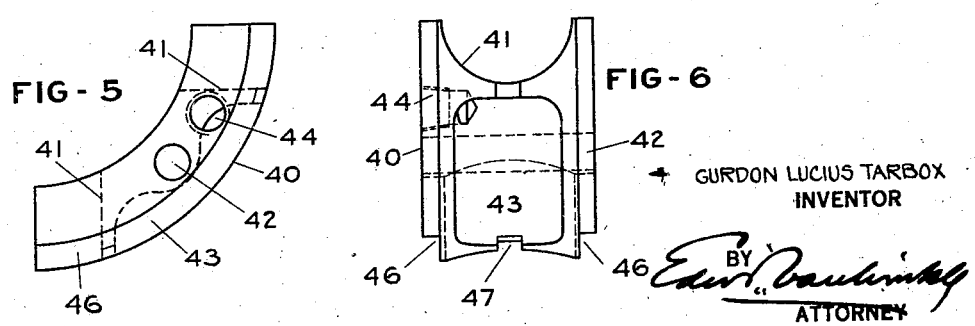
GURDON LUCIUS TARBOX
INVENTOR
ATTORNEY Patented Sept. 27, 1927.

1,643,648

UNITED STATES PATENT OFFICE.

GURDON LUCIUS TARBOX, OF NORTH PLAINFIELD, NEW JERSEY.

UNIVERSAL JOINT.

Application filed June 24, 1926. Serial No. 118,305.

My invention relates to universal joints such as may be employed to connect rotatable power shafts of all kinds, and particularly to universal joints used on propeller shafts of automobiles, and has for its object to provide a commercial ring type joint that will be capable of withstanding the incidents of use. Further and more limited objects of the invention will appear in the specifications and will be realized in and through the combination of elements set forth in the claims.

In the drawings—Figure 1 represents a transverse view in part section of a universal joint embodying my invention.

Figure 3 is a view of the casing employed.

Figure 4 is a view of the casing at right angles to that shown in Figure 3.

Figures 5 and 6 are two views at right angles to each other of the retaining quadrants.

Figures 7 and 8 are two views at right angles to each other of the bushings employed.

Figure 9 is a detail of my retaining ring.

Figure 1:
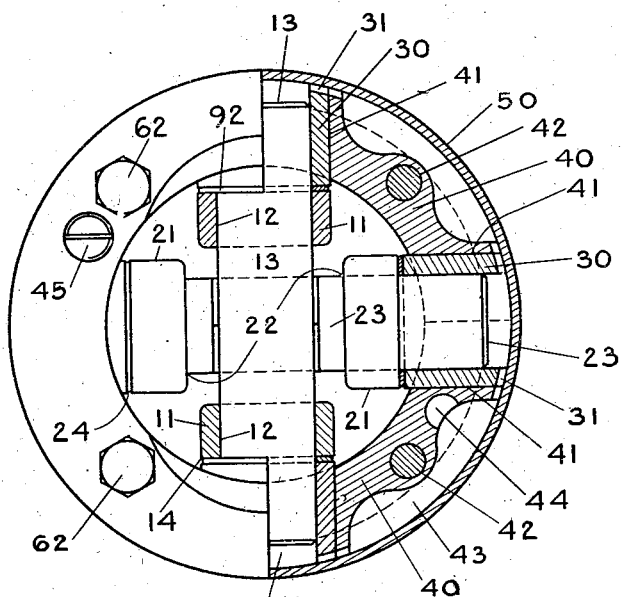

Describing the various parts by reference characters and in connection with Figures 1–9 inclusive 10 and 20 denote hubs, connected respectively with the driving and the driven shaft sections (not shown) the hubs are provided with yokes 11 and 21 each having through holes 12 and 22 to receive the trunnion pins 13 and 23 with a driving fit. These trunnion pins are cut away in the center to avoid interference during angular operation of the joint. It will be observed that with the construction shown shoulders 14 and 24 are provided at each end of the yoke surrounding the base of the trunnions.

In the construction shown four bushings 30 are provided, adapted to work on the ends of the trunnion pins, and are held in spaced relations by four quadrants 40. The bushings 30 are provided with curved ends 32 with slots 31 across the face thereof. The quadrants 40 are each provided with two semi-circular seats 41 which tightly clamp the bushings 30 and keep them from turning when assembled as shown inside of the tight filling casing 50.

The parts thus described are held within the casing 50 by the retainer ring 60 by a plurality of bolts 62 in the retaining ring holes 61, holes 51 in the casing, and holes 42 in the quadrants.

It will be observed that the quadrants are cut away in body as at 43 to provide space for lubricant which may be inserted through the hole 44 provided with a plug 45 or other lubricating fitting. These quadrants are also provided with a packing groove 46 in which rings of packing 90 are provided to seal the joint as assembled to prevent the escape of the lubricant.

Figure 2:
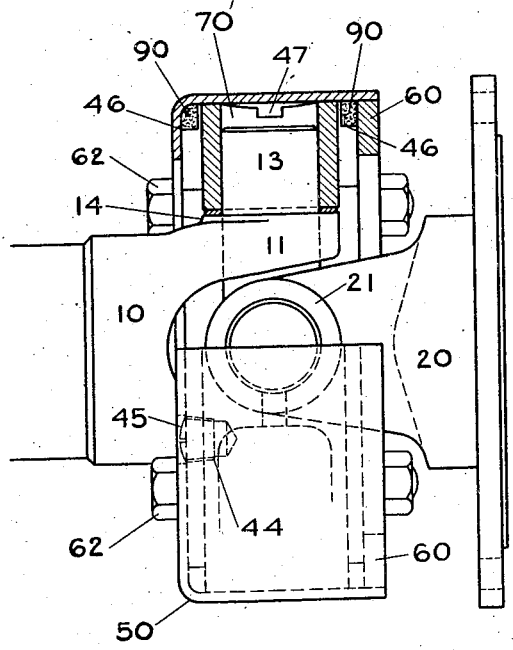
Figure 2 is a longitudinal elevation in part section thereof.

It will also be observed that slot 47 in the quadrants are so shaped that space is provided between the ends thereof and the casing 50—see Figure 2 so that the lubricant can flow from one quadrant to the space 70 beyond the end of the trunnion and into the next quadrant thereby ensuing complete circulation of the lubricant around the entire inside of the casing 50 delivering the lubricant to the trunnions which pivot within the bushings.

The assembly of the joint is as follows: The trunnion pins 13 and 23 are driven in the holes provided in the hubs 10 and 20 and the retainer ring 60 and casing 50 are slipped over the ends of the trunnions. It will be observed that the central holes in the retainer ring and the casing are elongated for this purpose. The bushings are then put in place on the trunnions with the quadrants 40 holding them in spaced relations. The washer or gaskets 90 are then placed in the grooves 46 provided and the assembly is pressed into position within the casing. The retainer ring is then positioned and the bolts 62 are then inserted making a tight and substantial torque ring.

Between the bushings and the shoulders on the yokes I provide a conical spring washer 92 to take up the thrust.

I wish it distinctly understood that my universal joint herein described is in the form in which I desire to construct it but that changes or variations may be made as may be convenient or desirable without departing from the salient features of my invention and I therefore intend the following claims to cover such modification as naturally falls within the lines of invention.

I claim:

1. In a universal joint, the combination with a driving and driven member and trunninons carried thereby, a built up connecting member comprising four quadrants each provided with two semi-circular seats, bushings adapted to fit in the seats and surround the trunnions, a casing completely surrounding the quadrants and bushing ends, the bushing ends being curved to conform to the inside of the casing, whereby the bushings are prevented from turning in their seats, and a retaining ring and means to hold the assembly together.

2. In a universal joint, the combination with a driving and driven member and trunnions carried thereby, a built up connecting member comprising four quadrants each provided with semi-circular seats, and a lubricant containing recess, cut away portions between the recess and the seats, bushings for the trunnions extending beyond the ends thereof and provided with cross slots and curved outer ends the said bushings adapted to be held in the seats, and a casing adapted to be forced over the quadrants and the curved ends of the bushings to hold the connecting member assembled and prevent the bushings from turning within the seats.

3. In a universal joint, the combination with a driving and driven member and trunnions carried thereby, a connecting member comprising four quadrants provided with semi-circular seats and lubricant containing recesses, bushings having curved ends adapted to fit between the quadrants, an outer casing adapted to tightly fit over the four quadrants and the curved ends of the bushings and prevent the bushings from turning within the seats said casing forming the other wall of the lubricant containing recesses in the quadrant, and means to prevent the lubricant from leaking due to centrifugal force.

In testimony whereof I have hereunto set my hand this seventeenth day of June, 1926.

GURDON LUCIUS TARBOX.